US010102766B2

(12) United States Patent
Komiyama

(10) Patent No.: US 10,102,766 B2
(45) Date of Patent: Oct. 16, 2018

(54) PORTABLE INFORMATION PROCESSING APPARATUS, TEST SUPPORT SYSTEM AND TEST SUPPORT METHOD

(71) Applicant: BENESSE CORPORATION, Okayama (JP)

(72) Inventor: Tomoyuki Komiyama, Tokyo (JP)

(73) Assignee: BENESSE CORPORATION, Okayama (JP)

( * ) Notice: Subject to any disclaimer, the term of this patent is extended or adjusted under 35 U.S.C. 154(b) by 295 days.

(21) Appl. No.: 14/905,564

(22) PCT Filed: Feb. 24, 2014

(86) PCT No.: PCT/JP2014/054273
§ 371 (c)(1),
(2) Date: Feb. 15, 2016

(87) PCT Pub. No.: WO2015/008501
PCT Pub. Date: Jan. 22, 2015

(65) Prior Publication Data
US 2016/0163214 A1 Jun. 9, 2016

(30) Foreign Application Priority Data
Jul. 16, 2013 (JP) .................................. 2013-148006

(51) Int. Cl.
*G09B 7/02* (2006.01)
*G06Q 50/20* (2012.01)
(Continued)

(52) U.S. Cl.
CPC .............. *G09B 7/02* (2013.01); *G06Q 50/20* (2013.01); *G09B 19/04* (2013.01); *G09B 19/06* (2013.01)

(58) Field of Classification Search
CPC . G09B 5/125; G09B 5/00; G09B 5/08; G09B 7/00
(Continued)

(56) References Cited

U.S. PATENT DOCUMENTS

| 8,583,030 B2 * | 11/2013 | Rao | ......................... H04L 67/42 434/322 |
| 2002/0102523 A1 * | 8/2002 | Pelletier | ................... G09B 7/00 434/323 |

(Continued)

FOREIGN PATENT DOCUMENTS

| JP | 2002-23610 A | 1/2002 |
| JP | 2004-234149 A | 8/2004 |

(Continued)

OTHER PUBLICATIONS

International Search Report and Written Opinion for International Patent Application No. PCT/JP2014/054273 filed on Feb. 24, 2014.
(Continued)

*Primary Examiner* — Michael Cuff

(57) ABSTRACT

A portable information processing apparatus, comprising: an execution part which executes an application of a test; an input part which inputs answer data of an examinee of the test; a storage part which stores the answer data in association with identification information of the examinee; and a sending part which sends the identification information and the answer data stored in the storage part to a server during the test or after completion of the test.

7 Claims, 15 Drawing Sheets

(51) Int. Cl.
*G09B 19/04* (2006.01)
*G09B 19/06* (2006.01)

(58) Field of Classification Search
USPC .................................. 434/350, 362
See application file for complete search history.

(56) References Cited

U.S. PATENT DOCUMENTS

| | | | | |
|---|---|---|---|---|
| 2003/0129573 | A1* | 7/2003 | Bowers | G06F 11/3684 434/350 |
| 2004/0048234 | A1* | 3/2004 | Allen | G09B 5/00 434/350 |
| 2005/0026130 | A1* | 2/2005 | Crowhurst | G09B 7/02 434/362 |
| 2006/0240394 | A1* | 10/2006 | Smith | G09B 7/00 434/322 |
| 2008/0096176 | A1* | 4/2008 | Rogers | G06Q 50/205 434/350 |
| 2008/0102435 | A1* | 5/2008 | Rogers | G09B 7/07 434/350 |
| 2008/0108038 | A1* | 5/2008 | Rogers | G09B 7/00 434/350 |
| 2011/0207108 | A1* | 8/2011 | Dorman | G09B 7/00 434/350 |
| 2013/0137077 | A1* | 5/2013 | Elangovan | G09B 7/02 434/350 |
| 2014/0212865 | A1* | 7/2014 | Morgan | G09B 7/00 434/350 |

FOREIGN PATENT DOCUMENTS

| | | |
|---|---|---|
| JP | 2008-46610 A | 2/2008 |
| JP | 2008-180838 A | 8/2008 |

OTHER PUBLICATIONS

TOEFL Home, [on Line], [Searched on Jul. 16, 2013], Educational Testing Service, Internet <URL: http://www.ets.org/lp/toefl>.
Masami Takahashi, Naze OSC ni 'Toki' ka?, [online], Open Source Conference 2012 Tokyo/Spring, Mar. 17, 2012, retrieval date Mar. 6, 2014.

* cited by examiner

Fig. 9

| SCHOOL | DATE/ TIME | GRADE | CLASS | STUDENT NUMBER | NAME | DATE OF BIRTH | ANSWER DATA |
|---|---|---|---|---|---|---|---|
| 00001 | 2013/5/31 | 2 | 1 | 0001 | AAA | 4/2 | ... |
| 00001 | 2013/5/31 | 2 | 1 | 0002 | BBB | 4/15 | ... |
| ... | ... | ... | ... | ... | ... | ... | ... |
| 00001 | 2013/5/31 | 2 | 5 | n | ZZZ | 3/25 | ... |

PORTABLE INFORMATION PROCESSING APPARATUS, TEST SUPPORT SYSTEM AND TEST SUPPORT METHOD

TECHNICAL FIELD

The present invention relates to a portable information processing apparatus, a test support system and a test support method.

BACKGROUND ART

Conventionally, for outside certification exams, an examinee went to a place certified by an exam institution and took an exam (test) at that place. For example, for TOEFL (Test of English as a Foreign Language) (registered trademark; see non-patent document 1) implemented by ETS (Educational Testing Service), an examinee went to an exam center selected by him(her)self and took an exam thereat.

CITATION LIST

Non-Patent Document

Non-Patent Document 1: TOEFL Home, [On Line], [Searched on Jul. 16, 2013] Internet <URL: http://www.ets.org/jp/toefl>

SUMMARY

Technical Problem

However, for conventional outside certification exams that use an information processing apparatus, there was a need to use an information processing apparatus provided at an exam site, and an examinee was not able to take the test unless he (she) went to such place. Moreover, at each exam site, for example, there was a need to purchase equipment that had specifications required for taking exams (such as PCs adapted for headsets, etc., hereinafter referred to as the "exam equipment") in order to prepare the exam equipment.

The object of the present invention is to provide a mechanism that enables an examinee to take a test at any exam site without the party in charge of the exam site having to prepare exam equipment. Furthermore, improvement in communication skills using English is to be admired due to the promotion of global human resource development in Japan, and particularly, improvement in English speaking skills has become a national issue. Guidance for developing speaking skills and appropriate evaluations thereof are required in an educational guidance procedure for high school. The present invention is able to lead to the realization of global human resource development since it requires less constraints for place and equipment compared to the prior art and is capable of evaluating speaking skills.

Solution to Problem

A portable information processing apparatus according to one embodiment of the present invention comprises: an execution part which executes an application of a test; an input part which inputs answer data of an examinee of the test; a storage part which stores the answer data in association with identification information of the examinee; and a sending part which sends the identification information and the answer data stored in the storage part to a server during the test or after completion of the test. This enables an examinee to take a test at any exam site without a party in charge of the exam site having to prepare exam equipment.

Moreover, the storage part may store answer data of a plurality of examinees in association with identification information of each examinee, and the sending part may collectively send a plurality of answer data associated with the identification information of each examinee. This enables the portable information processing apparatus to be repeatedly used and to collectively send the answer data to the server.

The sending part may send the plurality of answer data using a dedicated data line. This enables the answer data to be prevented from being falsified or tapped.

A test support system according to another embodiment of the present invention comprises a portable information processing apparatus that executes an application of a test, a server and an information processing apparatus. The portable information processing apparatus comprises: an input part which inputs answer data of an examinee of the test; a storage part which stores the answer data in association with identification information of the examinee; and a sending part which sends the identification information and the answer data stored in the storage part to the server. The server comprises: a receiving part which receives the identification information and the answer data sent from the portable information processing apparatus that was collected or that is in execution of the test; a first storage part which stores the identification information and the answer data received by the receiving part; and a second storage part which stores scoring data for the answer data received from the information processing apparatus in association with the identification information. The information processing apparatus comprises: a display part which displays a scoring screen that scores the answer data using a web browser; a scoring part which acquires scoring data using the scoring screen; and a sending part which sends the scoring data to the server. This enables an examinee to take a test at any exam site without a party in charge of the exam site having to prepare exam equipment.

Moreover, the portable information processing apparatus may store answer data of a plurality of examinees in association with identification information of each examinee, and the server may collectively receive a plurality of answer data associated with identification information of each examinee. This enables the portable information processing apparatus to be repeatedly used and the server to collectively receive the answer data.

Furthermore, the portable information processing apparatus that was collected or that is in execution of the test and the server may send and receive data using a dedicated data line. This enables the answer data to be prevented from being falsified or tapped.

In addition, the test may be a test taken by a plurality of examinees at the same time and at the same location. This enables the test of the present invention to also apply to outside certification exams.

In addition, the server may generate hierarchized folders using a plurality of information included in the received identification information and store the answer data in a folder at a lowermost level. This enables the answer data to be easily managed at the server.

A test support method according to another embodiment of the present invention, comprising: a portable information processing apparatus executing an application of a test; a server receiving answer data of the test stored in the portable information processing apparatus that was collected or that is in execution of the test; an information processing apparatus displaying a scoring screen of the answer data stored in the server; and the server acquiring scoring data that was scored using the scoring screen. This enables an examinee to take a test at any exam site without a party in charge of the exam site having to prepare exam equipment. Moreover, the portable information processing apparatus of the present invention comprises: a first memory which pre-stores an application of a speaking test; an execution part which executes the application stored in the first memory; a microphone which inputs answer data of the speaking test; a second memory which stores the answer data input through the microphone; and a sending part which sends the answer data input into the second memory to the server.

Advantageous Effects of Invention

The present invention enables an examinee to take a test at any exam site without a party in charge of the exam site having to prepare exam equipment.

BRIEF DESCRIPTION OF DRAWINGS

FIG. 9 is a diagram showing an example of identification information and answer data stored in a tablet terminal.

DESCRIPTION OF EMBODIMENTS

Embodiments of the present invention will be described below with reference to the drawings. However, the embodiments described below are intended to be only illustrative and do not exclude various modifications and applications of techniques which are not explicitly described below. Namely, the present invention can be carried out with various modifications without departing from the intended scope. In the description of the drawings below, same or similar parts are represented with the same or similar symbols. The drawings are schematic and do not necessarily correspond to the actual dimensions, ratios, etc. The drawings may include dimensional relationships and ratios that are different from each other.

[First Embodiment]

A portable information processing apparatus, a test support system and a test support method according to a first embodiment of the present invention will be described below with reference to the drawings. The test described below is an example of a test taken by a plurality of examinees at the same time and at the same location, and for example, an English certification exam including speaking may be assumed. The portable information processing apparatus may include, for example, a tablet terminal, a mobile terminal or a portable PC (personal computer), and may also be referred to as a "portable information processing terminal."

<Overview of Test Support System>

Figure 1:
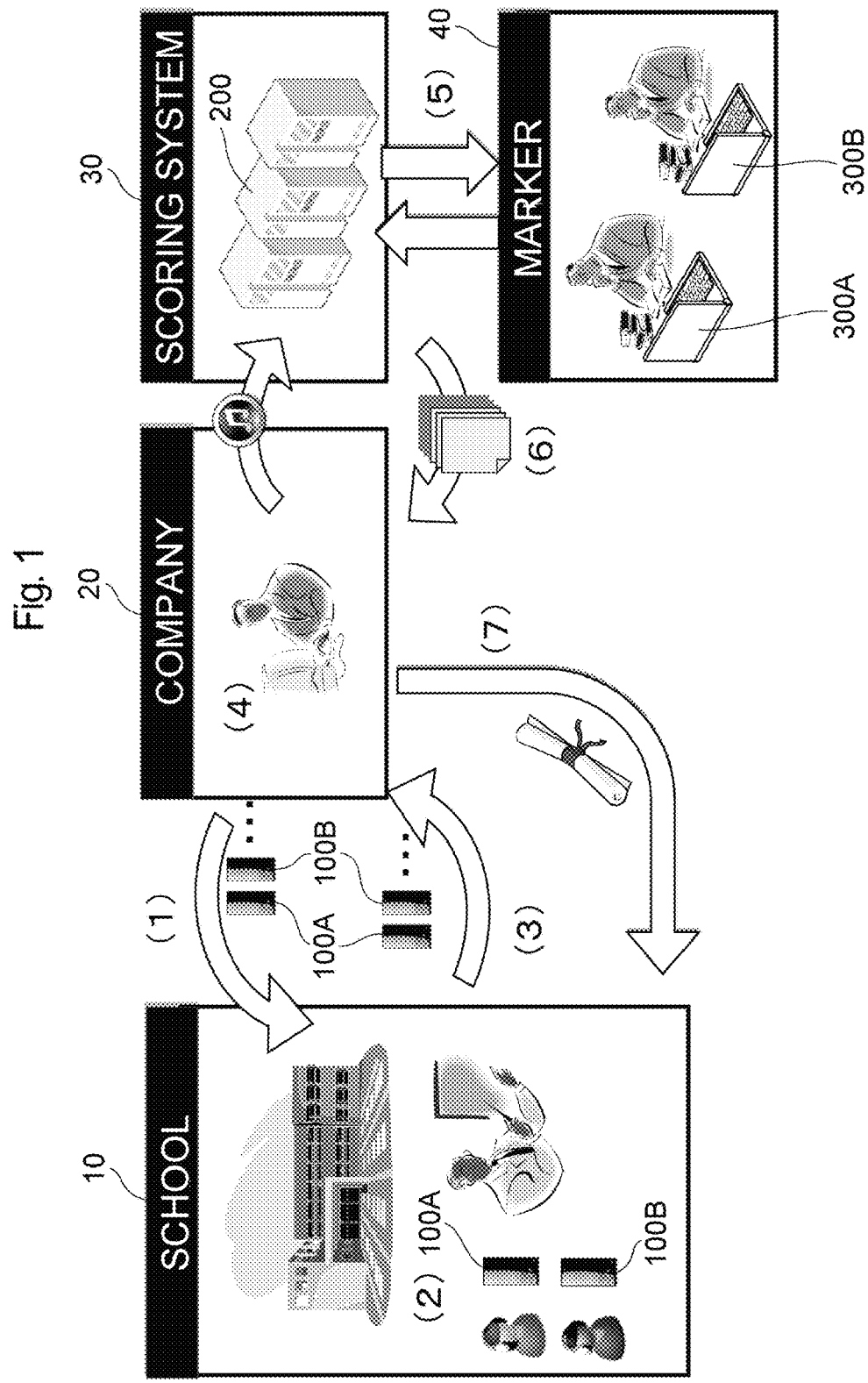
FIG. 1 is a conceptual diagram showing an example of a test support system according to a first embodiment.

FIG. 1 is a conceptual diagram showing an example of a test support system 1 according to a first embodiment. As shown in FIG. 1, for example, in the test support system 1, a test is implemented using a portable information processing terminal 100 distributed to a school 10, and the portable information processing terminal 100 which stores answer data therein is collected by a company 20.

Furthermore, in the test support system 1, test answer data that is stored in the collected portable information processing terminal 100 is sent to a server 200 of a scoring system 30. A marker 40 accesses the answer data stored in the server 200 of the scoring system 30 and causes an information processing apparatus 300 to display a scoring screen using a browser. The marker 40 uploads scoring data that was scored using a scoring screen to the server 200 of the scoring system 30. This enables the server 200 of the scoring system 30 to acquire the scoring data.

When portable information processing terminals are distinguished one by one, the portable information processing terminal 100 uses symbols such as 100A and 100B, and when the portable information processing terminals are collectively expressed, symbol 100 is used. The information processing apparatus used by the marker 40 also uses symbols in a similar way to that of the portable information processing terminal.

Next, a specific flow of the test support system 1 will be described.

The portable information processing terminal 100 will be described below, using a tablet terminal as an example.

(1) Delivery of Tablet Terminal 100

A company 20 delivers a required amount of tablet terminals 100 to a school 10 implementing a test. For example, the company 20 may lend the tablet terminal 100 to the school 10. When this takes place, the company 20 may deliver to the school 10 a user manual for the tablet terminal 100, along with the tablet terminal 100.

(2) Implementation of Test

The examinee uses the tablet terminal 100 delivered from the company 20 to take an English certification exam (hereinafter, simply referred to as the "test") including speaking at the school 10 or any other place. When this takes place, the examinee inputs his (her) identification information into the tablet terminal 100. The examinee's identification information is any information that is capable of identifying the examinee in the test support system 1, and such information may include, for example, the school code, date/time, grade, class, student number, katakana name and date of birth. The identification information may also be an exam number that is uniquely assigned to the examinee.

Furthermore, the examinee inputs test answers using the tablet terminal 100. For example, the examinee answering the problem displayed on the tablet terminal 100 by producing a voice towards the tablet terminal 100 causes answer data (e.g., answer voice) to be input into the tablet terminal 100. The tablet terminal 100 associates the answer data with the examinee's identification information and stores the data. In a case where the test problem is in writing, the answer data may be text data input by the examinee.

The tablet terminal 100 can be repeatedly used. For example, at a first period, a test can be implemented at class 1, and at a second period, a test can be implemented at class 2 using the same tablet terminal 100.

When this takes place, the tablet terminal 100 stores answer data of a plurality of examinees in association with identification information of each examinee.

(3) Return (Collection) of Tablet Terminal

When the implementation of the test is completed at the school 10, the school 10 returns the delivered tablet terminal 100 to the company 20 and the company 20 collects the delivered tablet terminal 100.

(4) Registration on Scoring System

The company 20 registers the collected tablet terminal 100 on the server 200 of the scoring system 30. For example, Wi-Fi (registered trademark) is used to send the answer data and the examinee's identification information stored in the tablet terminal 100 to the server 200. Preferably, wireless lines such as Wi-Fi (registered trademark) use data lines that are preregistered.

When this takes place, the server 200 automatically generates folders for each school, hierarchizes the folders and stores the answer data. For example, the server 200 may generate sub-folders in the order of school, grade, class and student and then store the answer data in the student folder at the lowermost level.

(5) Scoring

The marker 40 accesses the answer data stored in the server 200 and causes the information processing apparatus 300 to display a scoring screen using a browser. The marker 40 scores the answer data from the scoring screen on the scoring system 30. The marker 40 may be, for example, a native speaker at an overseas base.

When this takes place, the marker 40 provides scoring data (scores) for the answer data. This enables the scoring data to be uploaded on the scoring system 30 and the server 200 acquires and stores the scoring data.

(6) Preparation of Score Report

Through a command given by a person in charge at the company 20 or a consignor, the scoring system 30 or the information processing apparatus (not shown) in the company 20 prepares a score report based on the scoring data stored on the scoring system 30. The score report lists an examinee's identification information, an examinee's rank out of all examinees, an average score of all examinees, a comparison with previous tests, a future studying strategy, etc.

(7) Delivery of Score Report

Through a command given by a person in charge at the company 20 or a consignor, the scoring system 30 or the information processing apparatus in the company 20 sends the prepared score report to the information processing apparatus of the school 10. The information processing apparatus of the school 10 displays the received score report on a display. For example, the teacher considering this report allows education policies of the school 10 and teaching methods of each individual teacher to be considered and revised. Moreover, if scores have risen when students look at their score data, this may lead to an increase in their motivations. The score report printed by a printing company may be delivered to the school 10.

<Configuration of Test Support System>

Figure 2:
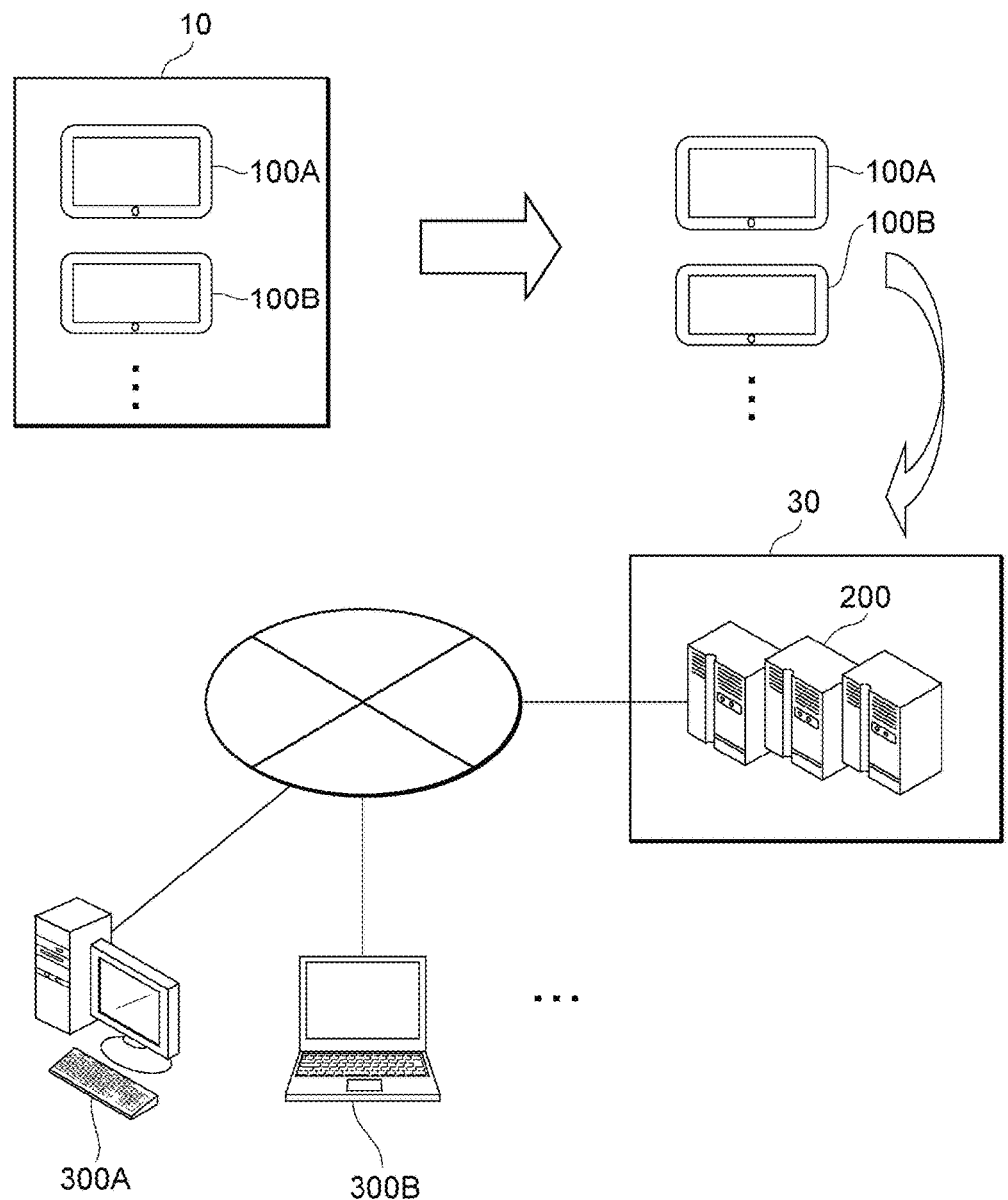
FIG. 2 is a block diagram showing an example of a configuration of a test support system according to a first embodiment.

Next, a configuration of a test support system 1 according to a first embodiment will be described. FIG. 2 is a block diagram showing an example of the configuration of the test support system 1 according to the first embodiment. In the example shown in FIG. 2, the test support system 1 includes a tablet terminal 100, a server 200 and an information processing apparatus 300.

One tablet terminal 100 is distributed to each examinee of the test. An application that executes a test is pre-installed in the tablet terminal 100. At a predetermined period or after a sign is given by an examiner or a teacher, the examinee can take the test by executing the application of the test. When taking the test, the examinee may input his (her) identification information beforehand and start the test all at once, after waiting for a sign.

When a command for starting the test is given by the examinee, the tablet terminal 100 displays a test problem or outputs a problem through voice. The examinee inputs an answer for the test problem using an operation screen of the tablet terminal 100 and produces a voice towards the tablet terminal 100 as an answer.

The tablet terminal 100 stores the answer input by the examinee as answer data, along with the examinee's identification information, in a storage unit of its own terminal. The answer may be, for example, voice for a speaking problem or input characters for a writing problem, and the answer data may be, for example, voice data or text data. There may be a plurality of test problems. In such case, voice data or text data is stored (recorded) in the tablet terminal 100 for each problem. Access to the answer data stored in the tablet terminal 100 is limited in order to prevent other examinees from looking at the answer. While the text is being executed, the tablet terminal 100 may automatically send answer data to the server 200 using wireless communication, etc.

The server 200 receives the examinee's identification information and answer data from the collected or returned tablet terminal 100 and stores it in a storage unit of its own apparatus. For example, when an administrator logs into the tablet terminal 100 and turns on the Clear to Send Data switch, etc., the server 200 receives the examinee's identification information and answer data using wireless communication, for example, Wi-Fi (registered trademark). The wireless communication may be, for example, communication through a wired network or via wireless communication using a dedicated data line of the present system. Furthermore, the server 200 may receive answer data using wireless communication and such while the tablet terminal 100 is executing the test.

When the server 200 receives the data, the server 200 automatically generates a folder and efficiently manages voice data. For example, the server 200 manages the voice data using a hierarchical structure of folders. The hierarchical structure of folders is generated using a plurality of information included in the examinee's identification information.

Specifically, the server 200 hierarchizes the folders in the order of information included in the examinee's identification information. For example, the server 200 sets a school folder at the uppermost level, then hierarchizes the folders in the order of data/time folder, grade folder, class folder and student folder and includes the voice data of the answer in the student folder at the lowermost level. When this takes place, the name of the file including the voice data may be converted to an ID and the ID may be assigned to the voice data. The ID may be used for the identification information of the voice data during scoring.

Next, the information processing apparatus 300 displays a scoring screen that scores the voice data stored in the server 200 using a web browser and acquires scoring data of a scored result given by the marker 40. The information processing apparatus 300 is an apparatus used by the marker 40. The information processing apparatus 300 may be an apparatus provided overseas.

For example, the marker 40 may be a native speaker overseas and a plurality of markers 40 each scores the voice data assigned to himself (herself) using the information processing apparatus 300. The company 20 sends the detailed data for scoring standards to the marker 40 in advance.

The information processing apparatus 300 of the marker 40 outputs one or more items of voice data to be scored from the scoring screen and scoring is performed by the marker 40 who has seen the detailed data for scoring standards. Moreover, a plurality of markers 40 may score the same voice data so as to reduce variations of scored results caused by different markers 40.

The information processing apparatus 300 of the marker 40 uploads the scoring data of the scored result to the server 200 through the command given by the marker 40. This enables the server 200 to acquire the scoring data.

Next, through a command given by a person in charge at the company 20 or a consignor, the information processing apparatus (not shown) of the person in charge or the consignor acquires the scoring data from the server 200 and performs a grading process. The grading process may be performed based on, for example, IRT (Item Response Theory). Moreover, the grading process may be a comprehensive grading process including a personal total, a school total, a national total, etc.

Through a command given by a person in charge at the company 20 or a consignor, the information processing apparatus of the person in charge or the consignor prepares for delivery of the score report that is based on the grade given through the grading process to the school 10 or sends an electronic score report. Moreover, through a command given by a person in charge at the company 20 or a consignor, the information processing apparatus of the person in charge or the consignor may prepare for delivery or send, in addition to the score report, a report for teachers which includes an analysis of grades of the entire class, to the school 10.

<Hardware Configuration>

Figure 3:
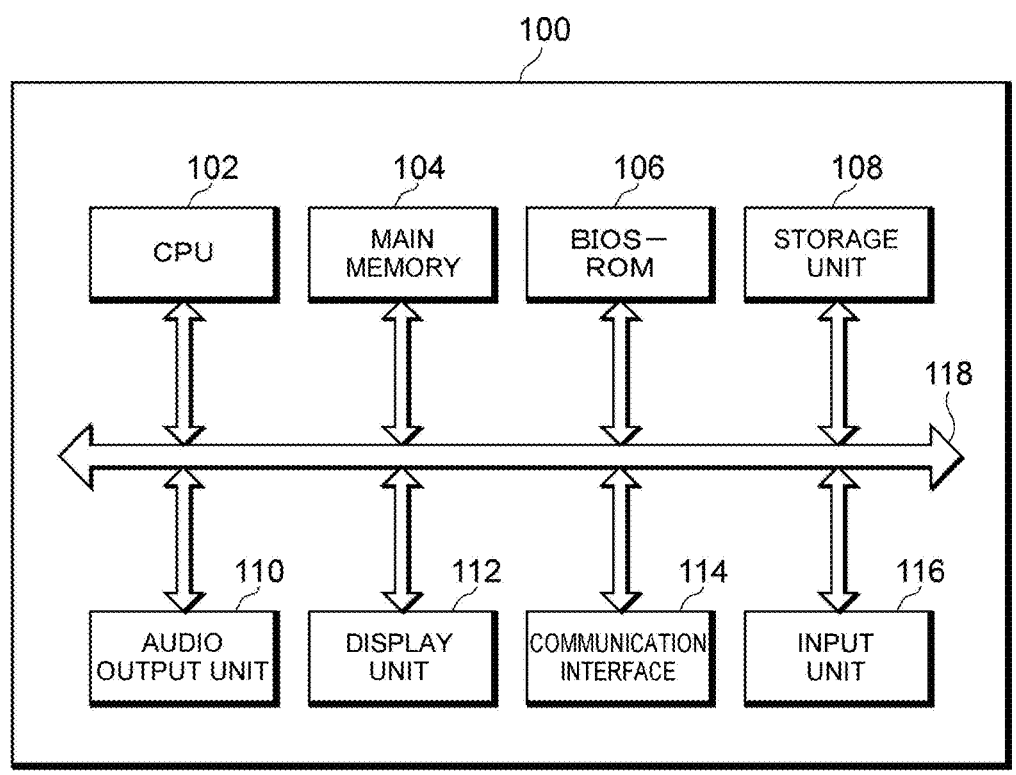
FIG. 3 is a block diagram showing an example of a hardware configuration of a tablet terminal.

Next, a hardware configuration of each apparatus in a test support system 1 will be described. FIG. 3 is a block diagram showing an example of a hardware configuration of a tablet terminal 100. The tablet terminal 100 shown in FIG. 3 includes, for example, a CPU (Central Processing Unit) 102, a main memory 104, a BIOS-ROM 106, a storage unit 108, an audio output unit 110, a display unit 112, a communication interface 114, an input unit 116 and a system bus 118 connecting the same.

The CPU 102, for example, executes a test program developed on the main memory 104 and causes the tablet terminal 100 to implement various functions. In other words, the tablet terminal 100 implements the test by executing a test program under the control of the CPU 102. The BIOS-ROM 106 stores a program that manages and controls hardware of the tablet terminal 100.

The storage unit 108 stores programs and various data. An audio output unit 110 outputs various sounds processed under the control of the CPU 102. A display unit 112 displays various images processed under the control of the CPU 102. A communication interface 114 is an interface that enables communication with the server 200 or other apparatuses. An input unit 116 may be, for example, a touch panel which receives input of a user operation or a microphone which receives input of a voice. Moreover, the input unit 116 may receive input of a user operation through a keyboard connected to the tablet terminal 100.

Figure 4:
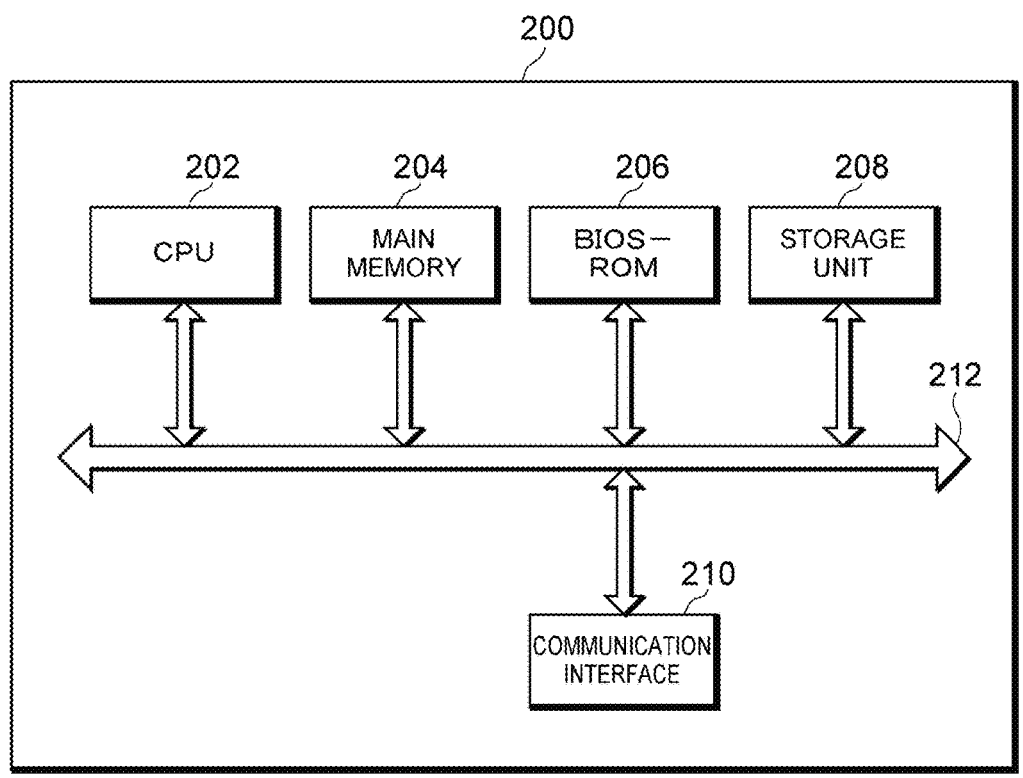
FIG. 4 is a block diagram showing an example of a hardware configuration of a server.

Next, a hardware configuration of the server 200 of the scoring system 30 will be described. FIG. 4 is a block diagram showing an example of a hardware configuration of the server 200. The server 200 shown in FIG. 4 may include, for example, a CPU 202, a main memory 204, a BIOS-ROM 206, a storage unit 208, a communication interface 210 and a system bus 212 connecting the same.

The functions of the CPU 202, the main memory 204, the BIOS-ROM 206, the storage unit 208 and the communication interface 210 are the same as the functions of the CPU 102, the main memory 104, the BIOS-ROM 106, the storage unit 108 and the communication interface 114 shown in FIG. 3, respectively.

Figure 5:
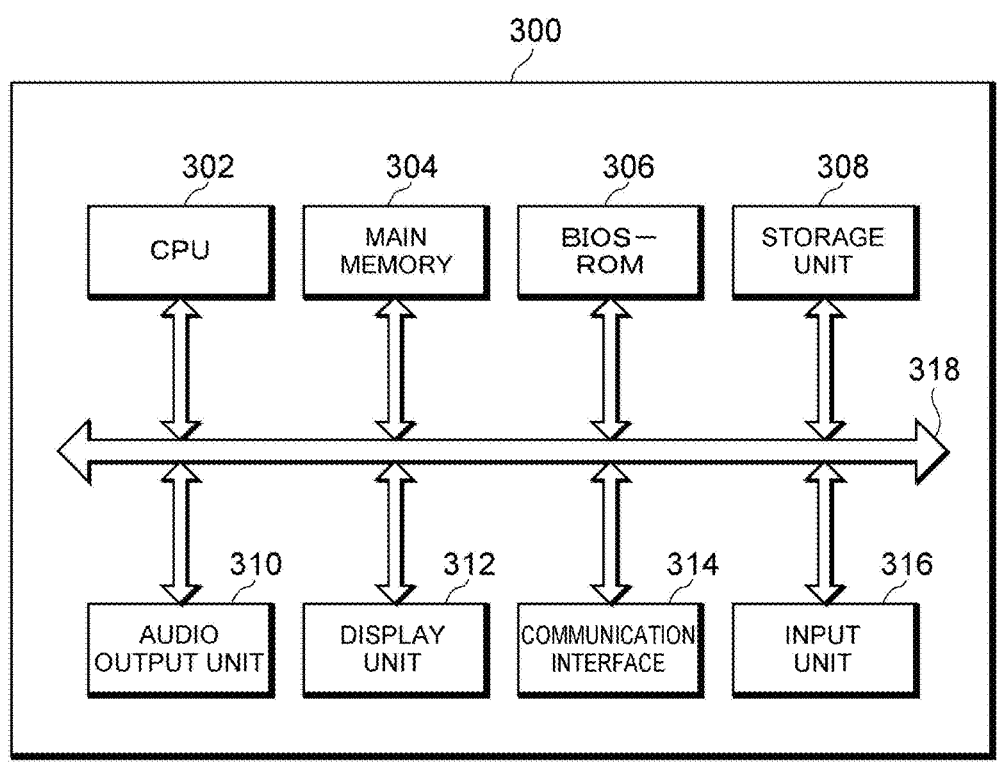
FIG. 5 is a block diagram showing an example of a hardware configuration of an information processing apparatus.

Next, a hardware configuration of the information processing apparatus 300 used by the marker 40 will be described. FIG. 5 is a block diagram showing an example of a hardware configuration of the information processing apparatus 300. The information processing apparatus 300 shown in FIG. 5 may include, for example, a CPU 302, a main memory 304, a BIOS-ROM 306, a storage unit 308, an audio output unit 310, a display unit 312, a communication interface 314, an input unit 316 and a system bus 318 connecting the same. The input unit 316 shown in FIG. 5 is an input apparatus such as a keyboard. Every part other than the input unit 316 includes the same function as that of each corresponding part shown in FIG. 3.

<Functional Configuration>

Next, each functional configuration in the test support system 1 will be described. Firstly, the functional configuration of the tablet terminal 100 will be described.

Figure 6:
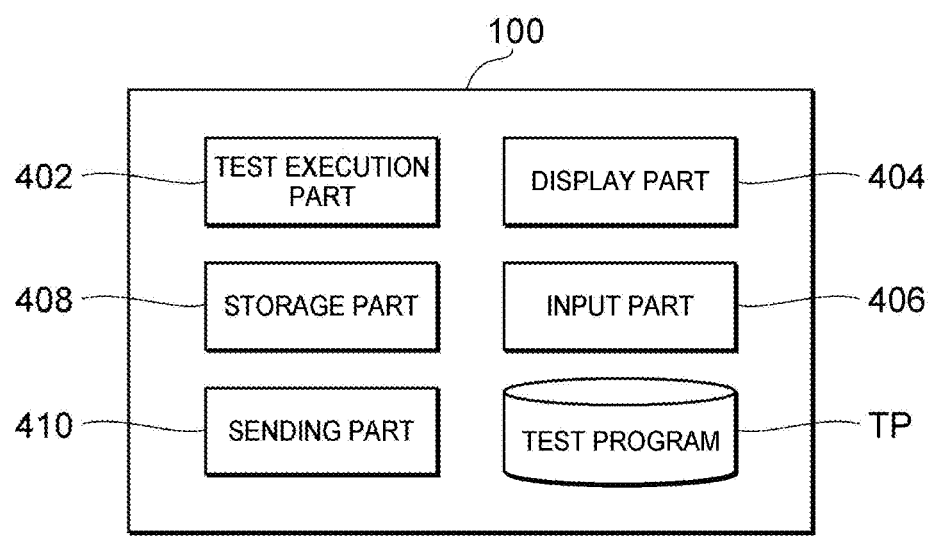
FIG. 6 is a block diagram showing an example of a functional configuration of a tablet terminal.

FIG. 6 is a block diagram showing an example of a functional configuration of the tablet terminal 100. The tablet terminal 100 shown in FIG. 6 may include, for example, a test execution part 402, a display part 404, an input part 406, a storage part 408 and a sending part 410. The tablet terminal 100 includes each of the functions for carrying out a predetermined test, for example, an English speaking test, by executing a test program TP.

The test execution part 402 may be implemented through, for example, the CPU 102, the main memory 104, the test program TP, etc. The test execution part 402 executes the application of the test and displays a test screen on the display part 404 of the tablet terminal 100 through execution of the test program TP.

Firstly, the test execution part 402 causes the examinee to input predetermined items using the display part 404. Predetermined items may include a school code, date/time, grade, class, student number, name and date of birth. Next, the test execution part 402 executes a test and outputs a problem to the display part 404. The test execution part 402 can execute a test even in an off-line state where the line is cut off from the network. This enables the test to be implemented regardless of the place, as long as there is a tablet terminal 100.

The display part 404 may be implemented through, for example, the display unit 112, the CPU 102, the main memory 104, the test program TP, etc. The display part 404 displays an input screen of the examinee's identification information or displays a screen of a test problem.

The input part 406 may be implemented through, for example, the input unit 166, the CPU 102, the main memory 104, the test program TP, etc. The input part 406 inputs the examinee's identification information and test answer data input by the examinee. For example, the input part 406 inputs the examinee's operation using a touch panel, etc. and inputs the examinee's voice using a microphone.

The storage part 408 may be implemented through, for example, the CPU 102, the main memory 104, the storage unit 108, the test program TP, etc. The storage part 408 associates the identification information and the answer data acquired from the input part 406 and stores the same. The storage part 408 can store answer data of a plurality of examinees in association with identification information of each examinee. When the answer data is stored, access to the storage part 408 is limited so as to prevent other examinees from looking at the answer data. The answer data stored in the storage part 408 becomes accessible when the above-described administrator logs into the tablet terminal 100. Moreover, the storage part 408 includes a first memory that stores an application program of the test and a second memory that stores the answer data. The first memory and the second memory may be the same storage unit or may be different storage units.

The sending part 410 may be implemented through, for example, the communication interface 114, the CPU 102, the main memory 104, the test program TP, etc. After the tablet terminal 100 is collected by the company 20, the sending part 410 sends the identification information and the answer data stored in the storage part 408 to the server 200 through the network. When this takes place, the sending part 410 may send the data to the server 200 using a dedicated data line. This enables the answer data to be prevented from being falsified or tapped.

When the answer data of a plurality of examinees is stored in the storage part 408, the sending part 410 can send the plurality of identification information and answer data collectively to the server 200. Moreover, the sending part 410 may send the answer data to the server 200 while the test is being executed.

According to the above, the tablet terminal 100 includes the functions of executing the test and storing the examinee's identification information and answer data after the tablet terminal 100 is distributed to the school 10 from the company 20, as well as sending the identification information and answer data to the server 200 after the tablet terminal 100 is collected by the company 20. Since the tablet terminal 100 that executes the test is distributed from the company 20, the school 10 does not have to prepare equipment appropriate for the test. Even if the answer data is sent to the server 200 during the test, the test support system 1 has less constraints in terms of place and equipment compared to the prior art.

Figure 7:
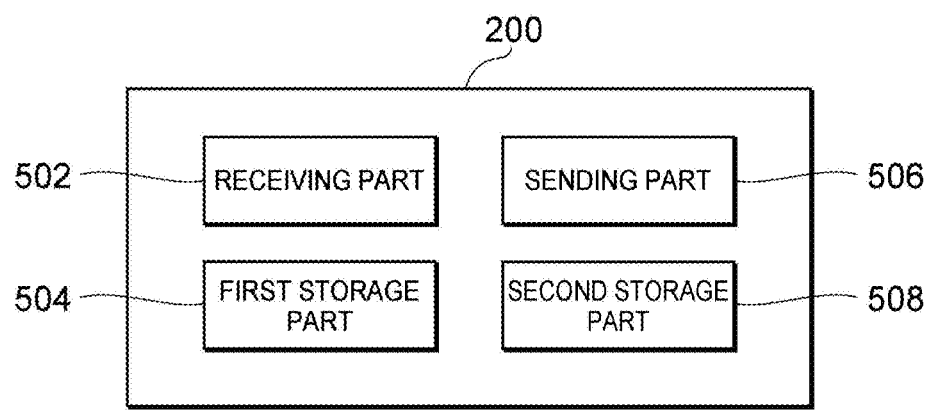
FIG. 7 is a block diagram showing an example of a functional configuration of a server.

Next, the functional configuration of the server 200 in the test support system 1 will be described. FIG. 7 is a block diagram showing an example of a functional configuration of the server 200. The server 200 shown in FIG. 7 may include, for example, a receiving part 502, a first storage part 504, a sending part 506 and a second storage part 508.

The receiving part 502 may be implemented through, for example, the communication interface 210, the CPU 202, the main memory 204, etc. The receiving part 502 receives the examinee's identification information and answer data sent from the portable information processing terminal 100 that has been collected or that is currently executing the test. The receiving part 502 may receive a plurality of identification information and answer data collectively from the tablet terminal 100. Moreover, the receiving part 502 receives the scoring data from the information processing apparatus 300 used by the marker 40. The identification information and answer data are stored in the first storage part 504 and the scoring data is stored in the second storage part 508.

The first storage part 504 may be implemented through, for example, the CPU 202, the main memory 204, the storage unit 208, etc. The first storage part 504 stores the received examinee's identification information and answer data. The first storage part 504 is capable of facilitating the management of answer data by storing the answer data hierarchically using the identification information.

The sending part 506 may be implemented through, for example, the communication interface 210, the CPU 202, the main memory 204, etc. When the answer data is accessed by the information processing apparatus 300 used by the marker 40, the sending part 506 sends a predetermined amount of answer data along with the ID for identifying the examinee to the information processing apparatus 300.

The second storage part 508 may be implemented through, for example, the CPU 202, the main memory 204, the storage unit 208, etc. The second storage part 508 stores the received ID and the scoring data. The first storage part 504 and the second storage part 508 do not necessarily have to be different storage units but may also be the same storage unit.

According to the above, the server 200 includes the functions of receiving the examinee's identification information and answer data from the collected portable information processing terminal 100, storing such information and answer data, sending the answer data when it is accessed by the information processing apparatus 300, receiving the scoring data from the information processing apparatus 300 and storing such data.

Figure 8:
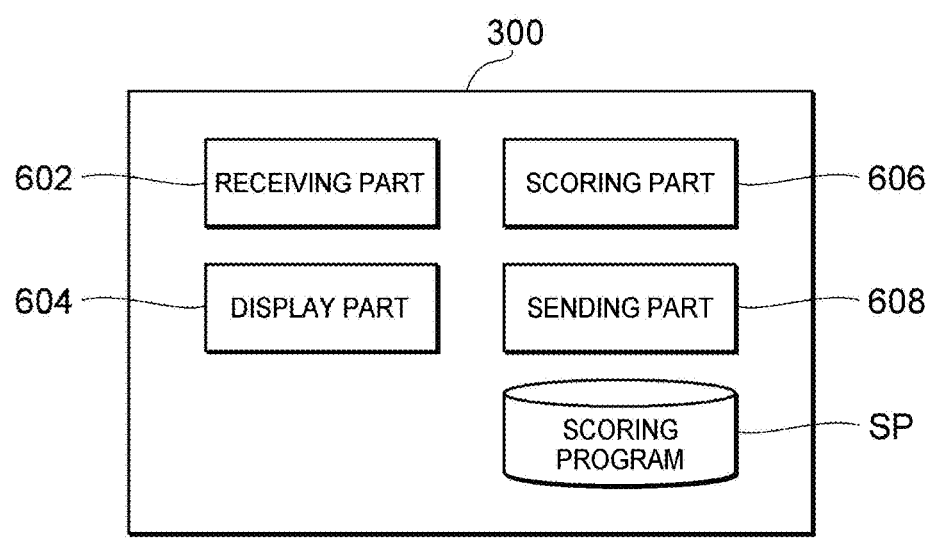
FIG. 8 is a block diagram showing an example of a functional configuration of an information processing apparatus.

Next, the functional configuration of the information processing apparatus 300 in the test support system 1 will be described. FIG. 8 is a block diagram showing an example of a functional configuration of the information processing apparatus 300. The information processing apparatus 300 shown in FIG. 8 includes a receiving part 602, a display part 604, a scoring part 606 and a sending part 608.

The information processing apparatus 300 includes each function for scoring the answer data through execution of the scoring program SP. The marker 40 downloads and installs the scoring program SP generated by the company 20 onto the information processing apparatus 300.

The receiving part 602 may be implemented through, for example, the communication interface 314, the CPU 302, the main memory 304, the scoring program SP, etc. The receiving part 602 receives, for example, answer data with ID from the server 200.

The display part 604 may be implemented through, for example, the display unit 312, the CPU 302, the main memory 304, the scoring program SP, etc. The display part 604 displays the scoring screen for scoring the acquired answer data on the display unit 312 using a web browser.

The scoring part 606 may be implemented through, for example, the display unit 312, the CPU 302, the main memory 304, the scoring program SP, etc. The scoring part 606 acquires scoring data input by the marker 40 using the scoring screen. The scoring part 606, for example, acquires points that have been scored by a 10-point scale or a 100-point scale for one answer data.

The sending part 608 may be implemented through, for example, the communication interface 314, the CPU 302, the main memory 304, the scoring program SP, etc. The sending part 608 sends the scored scoring data with the ID to the server 200.

According to the above, the information processing apparatus 300 includes the functions of accessing the server 200 to acquire answer data, acquiring scoring data for the answer data and sending the scoring data to the server 200.

The scoring data stored in the server 200 is processed for grading using, for example, the information processing apparatus (not shown) of the company 20. For example, if a common test is implemented nationwide, the company 20 calculates the school total and the national total in addition to the personal total and prepares a score report of the grade aggregated results data. The company 20 delivers the prepared score report to each school 10 that implemented the test. Moreover, the personal total includes the past test results and a comparison between the past test results and the current test result. The company 20 may outsource the grading process to an outside company. The company 20 may allow a printing company to print the score report and deliver the score report from the printing company to each school 10.

It is considered that this enables the examinee that received the score report to know his (her) own weak points and make an effort to achieve a better result in the next text. Therefore, the distribution of the score report can improve the motivation of the examinee.

Furthermore, the company may analyze the grade for teachers and deliver or send a report for teachers to each school 10. For example, the teacher can know the weak points of the entire class and the distribution of the report for teachers can be used for future guidance.

<Data Examples>

Next, data examples used in the test support system 1 will be described. FIG. 9 is a diagram showing an example of identification information and answer data stored in the tablet terminal 100. As shown in FIG. 9, when the test is completed, the tablet terminal 100 associates the school code, date/time, grade, class, student number, name, date of birth and answer data and stores the same.

The school code, date/time, grade, class, student number, name and date of birth used here are identification information for identifying the examinee and are stored in association with the answer data. The examinee's identification information may be, for example, text data, and the answer data may be, for example, voice data at 44100 Hz, 16 bit and in a WAV format. If the test problems are separated into each set of problems, answer data is stored independently for each part.

The tablet terminal 100, for example, stores each data described above by a zip file that is encrypted in an AES (Advanced Encryption Standard) format.

Figure 10:
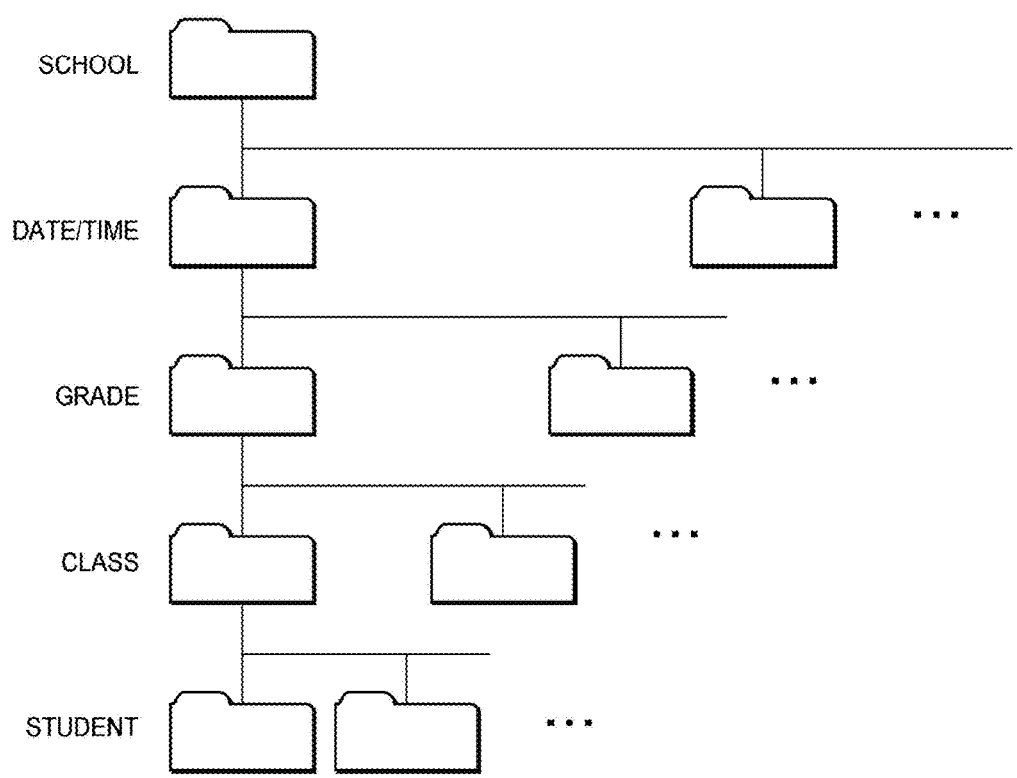
FIG. 10 is a diagram showing an example of identification information and answer data stored in a server.

FIG. 10 is a diagram showing an example of identification information and answer data stored in the server 200. The server 200 facilitates the management of answer data using a hierarchical structure. In the example shown in FIG. 10, the server 200 generates folders in the descending order of school, date/time, grade, class and student, and stores the student's answer data in the student folder. This enables calculation of a total for each school and a total for each class to be easily performed.

<Screen Examples>

Figure 11:
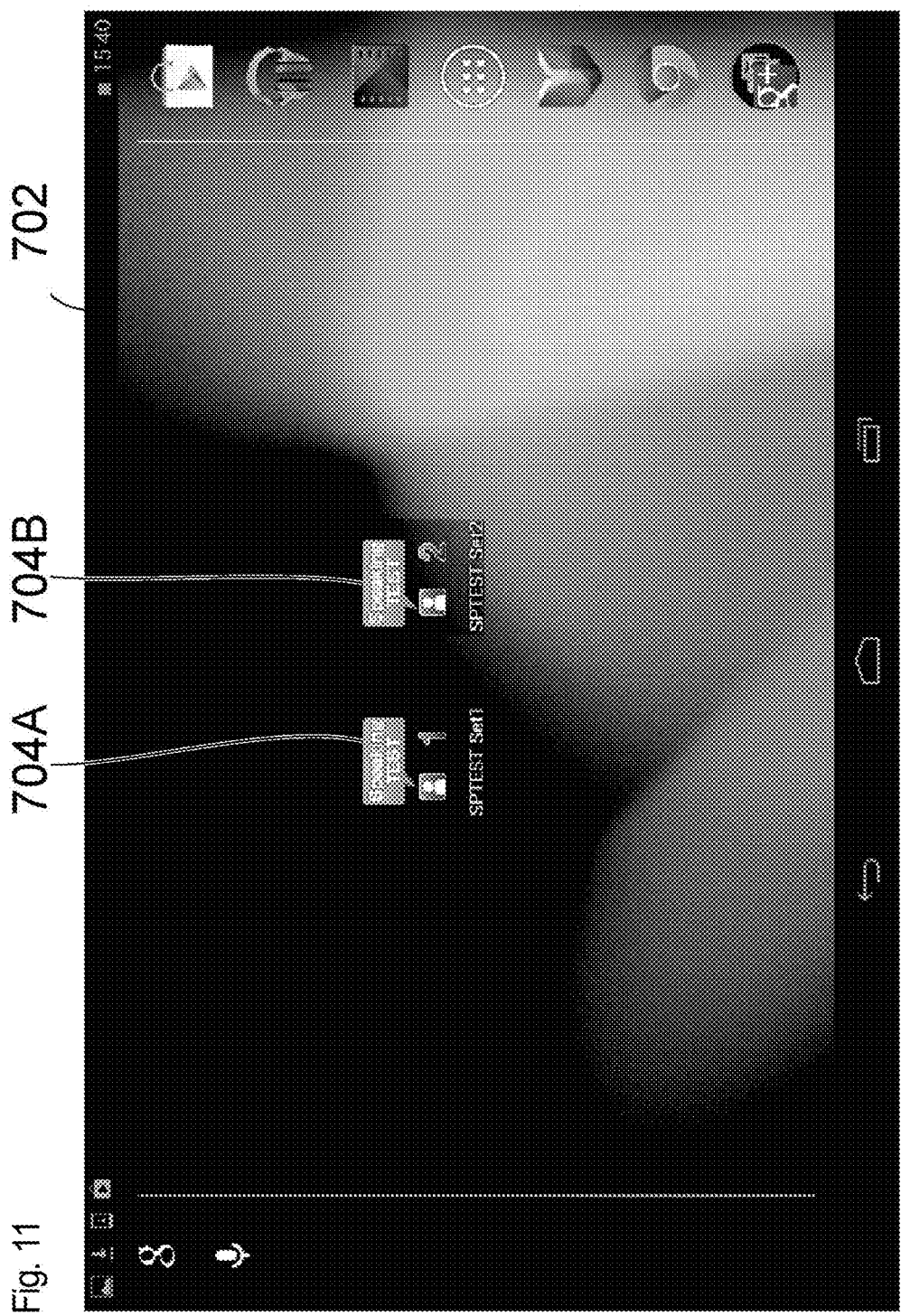
FIG. 11 is diagram showing an example of a screen during startup of power of a tablet terminal.

Next, screen examples of the test support system 1 will be described. FIG. 11 is a diagram showing an example of a screen during startup of power of the tablet terminal 100. As shown in FIG. 11, an example is shown where two test icons 704A and 704B are installed on the screen 702. There may be one or more, for instance, three or more, installed applications of the test. The examinee may take the test by clicking or double clicking either one of the test icons 704A and 704B as shown in FIG. 11.

Figure 12:
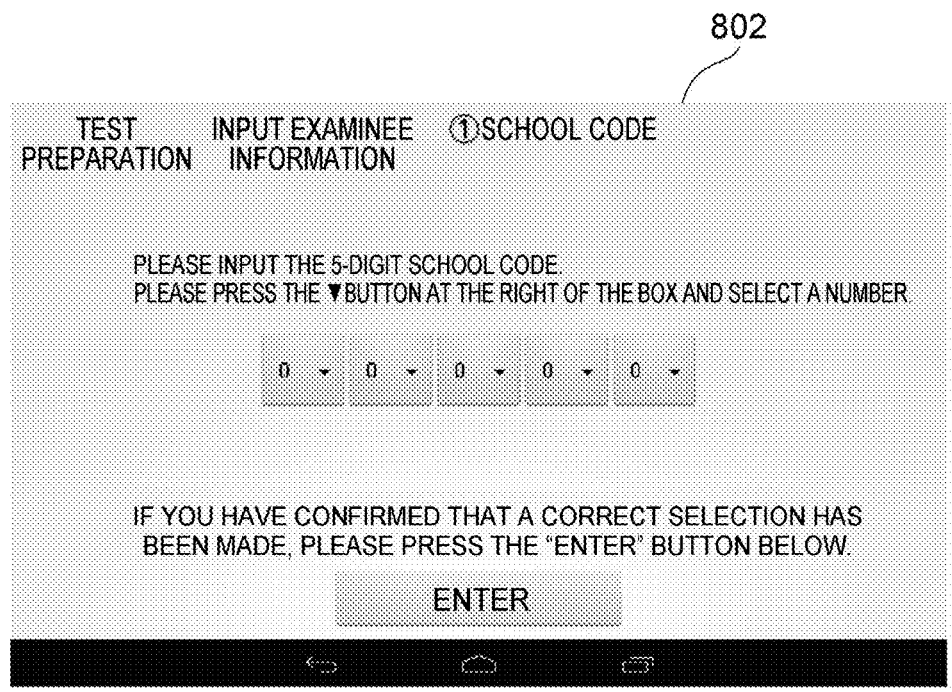
FIG. 12 is a diagram showing an example of a school code selection screen.

FIG. 12 is a diagram showing an example of a school code selection screen. The screen 802 shown in FIG. 12 is a screen that allows the examinee to select the school code by a 5-digit number. The tablet terminal 100 allows the examinee to select or input other identification information using a screen as shown in FIG. 12.

Figure 13:
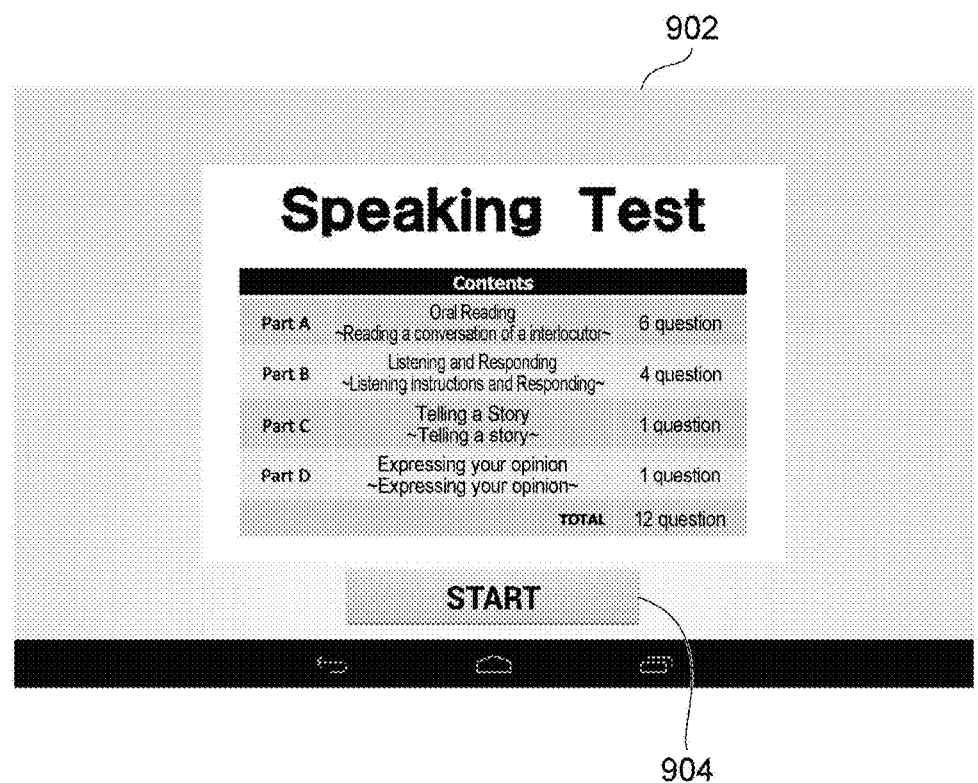
FIG. 13 is a diagram showing an example of a speaking test start screen.

FIG. 13 is a diagram showing an example of a speaking test start screen. The screen 902 shown in FIG. 13 displays an overview of the speaking test, and, in this example, the problems consist of four parts. For example, when the examinee completes inputting all of such examinee's identification information, the speaking test start screen shown in FIG. 13 is displayed. When this takes place, the examinee waits while the screen shown in FIG. 13 is displayed and can take the test by touching (clicking) a start button 904, with a sign from the examiner or the teacher.

Figure 14:
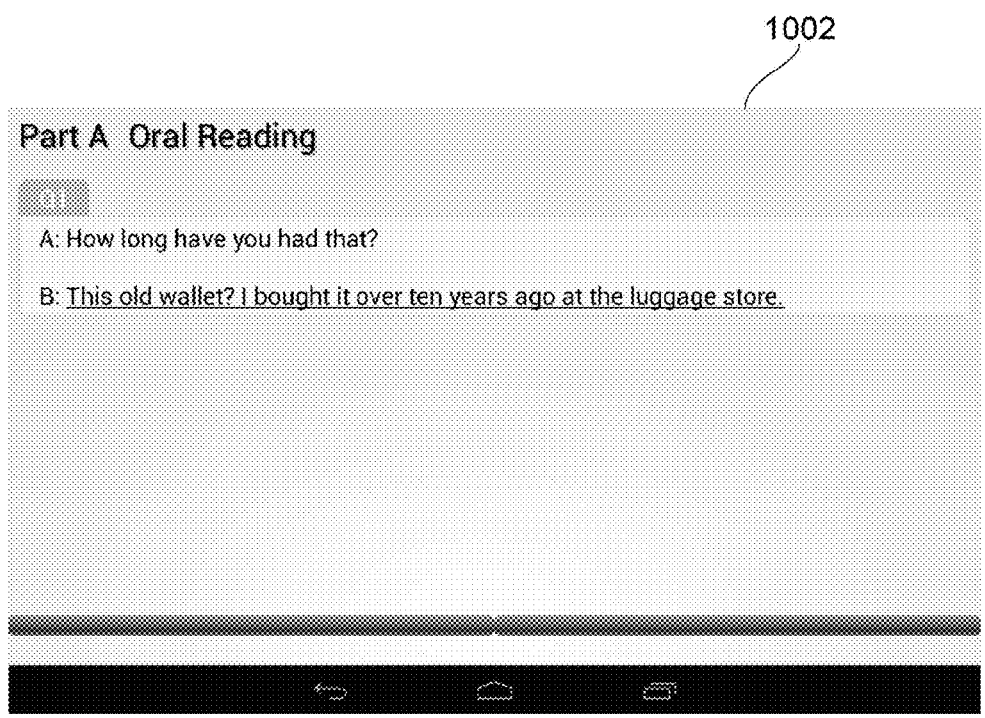
FIG. 14 is a diagram showing an example of a screen of Part A in a test.

FIG. 14 is a diagram showing an example of a screen of Part A in the test. The problem of screen 1002 shown in FIG. 14 is a problem in which the examinee reads out a sentence from B in Q1. The tablet terminal 100 inputs the voice (answer data) read out by the examinee through the microphone and stores it in the storage unit of its own terminal. The tablet terminal 100 independently stores each item of answer data input in respective Parts A to D. When this takes place, answer data for each part is stored in association with the examinee's identification information.

<Operations>

Figure 15:
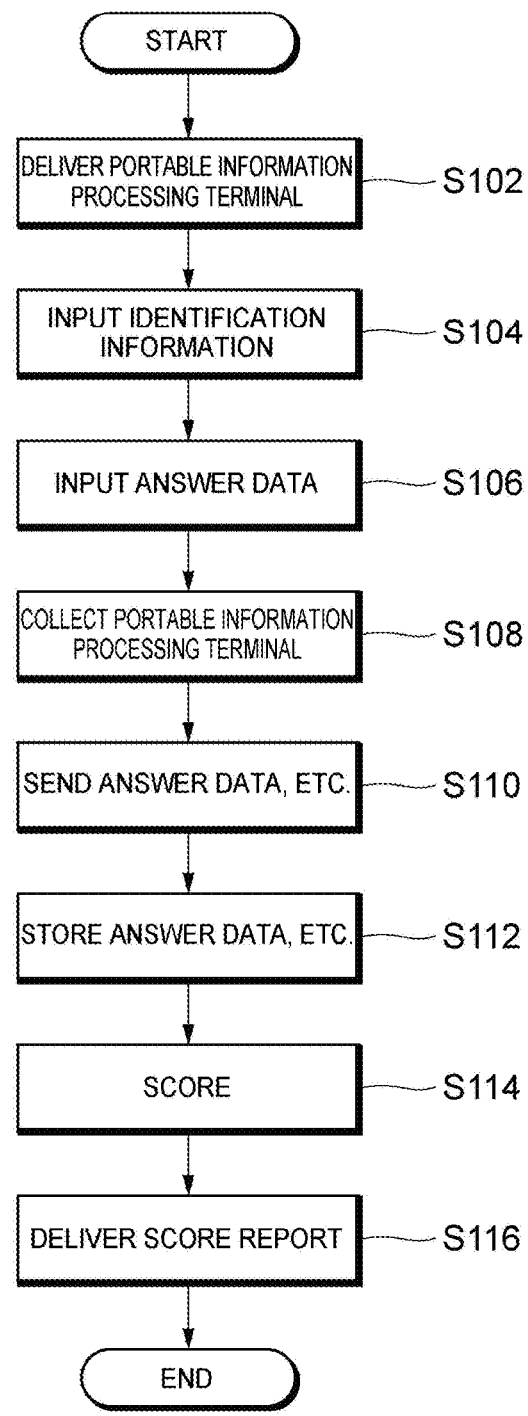
FIG. 15 is a flowchart showing an example of a process of a test support system according to a first embodiment.

Next, operations of the test support system 1 according to the first embodiment will be described. FIG. 15 is a flow chart showing an example of a process of the test support system 1 according to the first embodiment. In step S102 shown in FIG. 15, the company 20 delivers a required amount of tablet terminals 100 to each school that applied for the test by the date of implementation of the test.

In step S104, on the day of the test, the examinee inputs his (her) identification information by operating the portable information processing terminal (for example, a tablet terminal) 100.

In step S106, the examinee takes the test using the portable information processing terminal 100 and inputs the answer data into the portable information processing terminal 100. The input answer data is stored in the portable information processing terminal 100 in association with the examinee's identification information.

In step S108, when the school 10 completes the implementation of the test for all examinees, the school 10 returns to the company 20 all portable information processing terminals 100 that were distributed. Namely, the company 20 collects the portable information processing terminals 100 distributed to each school.

In step S110, the collected portable information processing terminal 100 sends the examinee's identification information and answer data to the server 200. For example, the data line may be a dedicated wireless line.

In step S112, the server 200 stores the examinee's identification information and answer data received from the collected portable information processing terminal 100. When this takes place, the server 200 may use a hierarchical structure of folders to facilitate the management of answer data.

In step S114, the information processing apparatus 300 accesses the answer data stored in the server 200, acquires the answer data using a web browser and displays the data on the scoring screen. The information processing apparatus 300 of the marker 40 displays the scoring screen and the answer data is scored based on the input by the marker 40. The information processing apparatus 300 acquires scoring data of the scored result given by the marker 40.

In step S116, the information processing apparatus of the company 20 performs a grading process based on the scoring data and gives commands for delivering or sends the score report including the result of the grading process to each school 10 that implemented the test.

Given the above, according to the first embodiment, a test support method and a test support system can be provided in which an examinee can take a test at any exam site without having to prepare specific exam equipment having a predetermined specification by a party in charge of the exam site. Furthermore, in a case where the answer data is sent to the server 200 after the collection of the apparatus, a test can be executed if there is a portable information processing terminal 100 that is installed with an application of the test. Namely, since the answer data of the test is stored in the portable information processing terminal 100 itself, there is no need to connect to the network during execution of the test. Moreover, in a case where the answer data is sent to the server 200 during the test, the period until the delivery of the score report can be shortened or this can save the need to send the answer data to the server 200 after the portable information processing terminal 100 has been collected. Furthermore, since a web browser is used to execute the test in the prior art, such as TOEFL (registered trademark), communication of problem data and answer data is needed between the server and the terminal. However, according to the first embodiment, since the application of the test is pre-stored in the portable information processing terminal 100, communication of problem data is not needed in the communication with the server 200. Therefore, according to the first embodiment, the communication capacity between the terminal and the server can be decreased compared to the prior art.

Moreover, since the portable information processing apparatus 100 can be repeatedly used, answer data for a plurality of examinees can be stored in one portable information processing terminal 100. In this case, a plurality of answer data can be collectively sent to the server 200 from the collected portable information processing terminal 100.

In addition, the test according to the first embodiment can also be applied to tests of outside certification exams which until now have only been able to be taken at a certified place.

[Modifications]

Although a first embodiment of techniques disclosed in the present application has been described above, the techniques disclosed in the present application are not limited to the above For example, tests are not only limited to speaking tests, but may also apply to other tests such as writing and reading tests. Furthermore, the tests may also apply to tests which are taken by a plurality of examinees at the same location but at different times, as well as tests which are taken by a plurality of examinees at different locations.

REFERENCE SIGNS LIST

1 Test support system
100 Portable information processing terminal
200 Server
300 Information processing apparatus
402 Test execution part
404 Display part
406 Input part
408 Storage part
410 Sending part
502 Receiving part
504 First storage part
506 Sending part
508 Second storage part
602 Receiving part
604 Display part
606 Scoring part
608 Sending part

What is claimed is:

1. A portable information processing apparatus for administering a speaking test, the apparatus comprising:
a processor which executes an application of a test;
an input device which receives identification information an examinee of the test;
a microphone that receives a first answer to a first question and a second answer to a second question;
a memory which stores an answer to the first question as first answer data, stores an answer to the second question as second answer data, and stores identification information of the examinee; and
an interface circuit which sends the identification information and the first and second answer data to a server during the test or after completion of the test using a dedicated data line,
wherein the portable information processing apparatus is provided to the examinee to perform a speaking test, and after the test is complete, the portable information processing apparatus with the first and second answer data is collected from the examinee.

2. The portable information processing apparatus according to claim 1, wherein the memory stores answer data of a plurality of examinees in association with the identification information of each examinee, and wherein the sending part collectively sends a plurality of answer data associated with the identification information of each examinee.

3. A test support system comprising a portable information processing apparatus that executes an application of a test, a server and an information processing apparatus, wherein the portable information processing apparatus comprises:
a processor which executes test software stored by the portable information processing apparatus;
an input device that receives identification data of an examinee of the test;
a microphone that receives a first answer to a first question in association with the identification data and a second answer to a second question in association with the identification data;
a memory which stores an answer to the first question as first answer data, stores an answer to the second question as second answer data in association with identification information of the examinee; and
an interface circuit which sends the identification information and the answer data stored in the storage part to the server over a dedicated data line,
wherein the server comprises:
a receiving part which receives the identification information and the answer data sent from the portable information processing apparatus over the dedicated data line;

a first storage part which stores the identification information received by the receiving part; and a second storage part which stores scoring data for the answer data received from the information processing apparatus in association with the identification information, and wherein the information processing apparatus comprises:

a display which displays a scoring screen that scores the answer data using a web browser;

a processor which acquires scoring data using the scoring screen; and an interface circuit which sends the scoring data to the server, wherein the portable information processing apparatus is provided to the examinee to perform a speaking test, and after the test is complete, the portable information processing apparatus with the answer data is collected from the examinee.

4. The test support system according to claim 3, wherein the portable information processing apparatus stores answer data of a plurality of examinees in association with identification information of each examinee, and wherein the server collectively receives a plurality of answer data associated with identification information of each examinee.

5. The test support system according to claim 3, wherein the test is a test taken by a plurality of examinees at the same time and at the same location.

6. The test support system according to claim 3, wherein the server generates hierarchized folders using a plurality of information included in the received identification information and stores the answer data in a folder at a lowermost level.

7. A test support system comprising:

a portable information processing apparatus that executes an application of a test, the portable information processing apparatus comprising:

an input device that receives identification data of an examinee of the test;

a microphone that receives a first answer to a first question in association with the identification data and a second answer to a second question in association with the identification data;

memory which stores an answer to the first question as first answer data, stores an answer to the second question as second answer data in association with identification information of the examinee; and an interface circuit which sends the identification information and the answer data stored in the storage part to the server over a dedicated data line;

a server receiving answer data of the test stored in the portable information processing apparatus that was collected or that is in execution of the test;

an information processing apparatus displaying a scoring screen of the answer data stored in the server; and the server acquiring scoring data that was scored using the scoring screen, wherein the portable information processing apparatus is provided to the examinee to perform a speaking test, and after the test is complete, the portable information processing apparatus with the answer data is collected from the examinee.

* * * * *